July 17, 1934.   M. MANNING   1,966,675
RELIEF VALVE
Filed Aug. 4, 1931
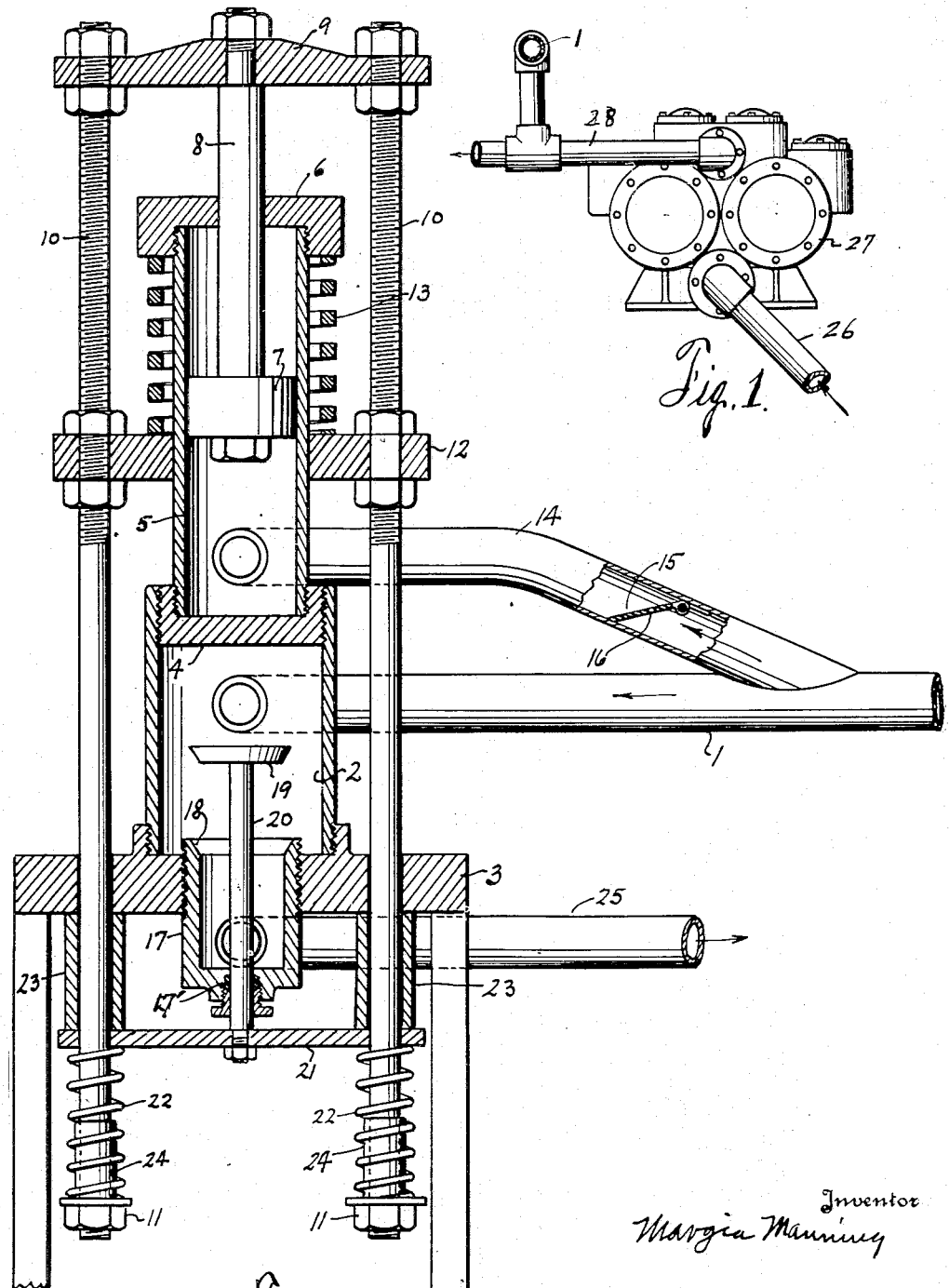

Patented July 17, 1934

1,966,675

UNITED STATES PATENT OFFICE 1,966,675

RELIEF VALVE

Margia Manning, Houston, Tex.

Application August 4, 1931, Serial No. 554,992

6 Claims. (Cl. 137—53)

This invention relates to a relief valve.

An object of the invention is to provide a relief valve mechanism for relieving the pressure from the high pressure line of a pump.

Another object of the invention is to provide means for relieving the fluid from the discharge line, or high pressure line, of a pump, in case said pressure becomes excessive, and returning said fluid back into the low pressure line, or pump intake.

A specific object of the invention is to provide a relief valve mechanism for the high pressure line, or discharge line, of a slush pump whereby said discharge line, and the pump, will be relieved of excessive pressures and injury due to such pressures.

With the above and other objects in view, this invention has particular relation to certain novel features of construction, operation and arrangement of parts, an example of which is given in this specification and illustrated in the accompanying drawing, wherein:

Figure 1 shows an end view of a pump showing the discharge line thereof.

Figure 2 shows a sectional view of the relief valve mechanism.

In the drawing the numeral 1 refers to the relief line which enters the cylinder 2 of the relief valve mechanism. This cylinder 2 is suitably anchored to the base, or other support 3. The cylinder 2 has a suitable head 4 thereon which supports a smaller cylinder 5 whose outer end is closed by the head 6. In the cylinder 5 there is a piston 7 attached to the piston rod 8 which works through a bearing in the head 6 and whose outer end is attached to the yoke 9.

There are the side rods 10, 10 attached at one end to the ends of the yoke 9 and these rods work through bearings in the base 3 and their other ends have the nuts 11 thereon. There is a cross head 12 between, and adjustably mounted on, the rod 10 and which surrounds the cylinder 5. Between this cross head 12 and the head 6 and surrounding the cylinder 5 there is a strong coil spring 13.

Connected into the relief line 1 there is the branch line 14 which enters the cylinder 5 between the head 4 and piston 7. This branch line is controlled by a conventional back pressure valve 15 having a leak port 16 therethrough.

Mounted in the base 3 there is a cylindrical cage 17 whose outer end is closed and whose inner end terminates in a flared valve seat 18 in the cylinder 2. There is an inwardly opening valve 19 arranged to cooperate with said seat and which is attached to the stem 20 which works through the stuffing box 17' in the outer end of the cage 17.

The outer end of the valve stem 20 is attached to the yoke 21 whose ends have slidable connections with the rods 10, 10. Between the ends of this yoke 21 and the nuts 11, and surrounding the rods 10 are the relatively light coil springs 22, 22. Stop sleeves 23, 23 through which the rods 10 slide, are arranged to limit the opening movement of the valve 19. Stops 24, 24 are also provided at the outer ends of the rods 10 to limit the compression of the springs 22 preparatory to the opening of said valve 19.

Leading out from the outer end of the valve cage 17 there is a discharge line 25 through which the excess fluid may be discharged, or returned to the low pressure, or intake, line 26 of the pump 27.

As illustrated the relief line 1 is shown connected into the high pressure, or delivery, line 28 of said pump and the relief valve 19 is shown open with the springs 22 relieved of their compression and with the spring 13 under compression and in position to return the plunger 7. The excess fluid is being now discharged through the line 25 and the spring 13 will gradually move the plunger 7 inwardly and force the fluid in the cylinder 5 out through the leak port 16. As the plunger 7 is moved inwardly the rods 10 will move correspondingly and the yoke 21 and valve 19 supported thereon will move outwardly, said valve 19 approaching closed position.

When said valve begins to restrict the fluid passageway through said seat the fluid acts against the valve 19 and will suddenly force the valve into fully closed position, the springs 22 yielding to permit this. This valve 19 will remain closed and the valve mechanism will remain in neutral, or inactive, position during the normal operation of the pump 27. Should the pressure of the fluid in the high pressure line 28 become excessive this excessive pressure will accumulate equally in the cylinders 2 and 5. The area of the plunger 7, exposed to said pressure, is greater than the area of the valve 19 so exposed. As the pressure of the fluid increases, the piston 7 will be forced outwardly, carrying the rods 10 and cross head 12 with it and placing the springs 13 and 22 under compression. The pressure of the fluid in the cylinder 2 against the valve 19 will be sufficient to hold the valve 19 closed for a time. The yoke 21, during this time, will be held stationary until the stops 24 engage against said yoke 21 and the further movement of the plunger 7 and rods 10 will force the valve 19 slightly open and the pressure in the cylinder 2 will be relieved and thereupon the springs 22 will immediately expand and suddenly and fully open the valve 19 to permit the discharge of the excess fluid and the relief of the excess pressure in the line 28. Upon the relief of the pressure from the cylinder 2, the plunger 7 will be returned by the spring 13 and the valve 19 will be again closed as above stated.

The drawings and description disclose what is now considered to be a preferred form of the invention by way of illustration only, while the broad principle of the invention will be defined by the appended claims.

What I claim is:

1. A pressure relief valve mechanism having a pair of cylinders, pressure fluid inlet conduits leading from a common source of fluid pressure and entering the respective cylinders, a piston in one cylinder exposed to the pressure of fluid therein, a back pressure valve in the corresponding conduit having a leak, said other cylinder having an outlet and a valve arranged to close said outlet, said valve having an area exposed to the pressure of the fluid less than that of said piston, means connected with the piston and movable thereby into one position to open the valve and into another position to permit the valve to close.

2. A pressure relief valve mechanism having a pair of cylinders, a pressure fluid inlet conduit having branches which enter the respective cylinders, a piston in one cylinder, means for retarding the outflow of liquid through the corresponding conduit, the other cylinder having a relief outlet and a valve arranged to control said outlet, yieldably mounted means connected to the piston and valve through which the valve may be moved to open position upon the actuation of said piston by the pressure of the fluid in the corresponding cylinder, said valve moving means including yieldable means effective, upon an initial opening of the valve, to accelerate the full opening, thereof.

3. A pressure relief valve mechanism having two fluid pressure chambers therein, a conduit leading from a source of pressure and having branches one entering each chamber, one chamber having an outlet and a valve controlling said outlet, a back pressure valve having a leak controlling the branch entering the other chamber, means in the other chamber connected to the valve and arranged to be actuated by the pressure of the fluid in said other chamber to open said valve, and means effective to actuate said fluid actuated means into position to permit the valve to close.

4. A pressure relief valve mechanism having two fluid pressure chambers therein each chamber having a pressure fluid inlet, and one of said chambers having a relief outlet, a valve controlling said outlet, actuating means in the other chamber exposed to the pressure of the fluid in said other chamber, means including compression springs connecting said actuating means to the valve whereby, upon the actuation of said means by said pressure, said springs will be placed under compression and the valve will be thereafter opened to permit the relief of the pressure fluid from the corresponding chamber, and yieldable means effective, upon such relief, to move said actuating means and connecting means into position to permit the valve to close and means for retarding the outflow of fluid from in front of the piston upon such piston movement.

5. In combination, a pressure relief line, a valve mechanism associated therewith and having a chamber to receive pressure fluid, through said line, from a source of pressure fluid and also having a relief outlet, a valve controlling said outlet, resilient means associated with said valve, valve actuating means arranged to be moved into one position by the pressure fluid from said line, means for permitting a gradual relief of the pressure fluid from said actuating means, resilient means arranged to be placed under compression upon such movement of said actuating means, means connecting said valve actuating means with the valve whereby the valve will be opened upon such movement of said actuating means and whereby said first named resilient means will be rendered active, said actuating means being movable by said second mentioned resilient means to another position to permit the valve to close, said first named resilient means being arranged to permit an accelerated final closing movement of said valve.

6. In combination a pressure relief line, a valve mechanism associated therewith and comprising a support, a pair of aligned cylinders connected together, and one of which is connected to said support, a piston in one of said cylinders, the other cylinder having an outlet, a piston rod to which said piston is attached, a yoke attached to said piston rod, side rods connected to the respective ends of said yoke at one end, an intermediate cross head between and mounted on said rods, yieldable means interposed between said cross head and the cylinder in which said piston is located, said relief line entering one cylinder and having a branch which enters the other cylinder in front of said piston, a yoke having a slidable connection with said rods, a valve for controlling said outlet having a stem connected to said last mentioned yoke, stops between said last mentioned yoke and said support and through which said rods slide, abutments on said rods, coil springs around the rods between said abutments and the last mentioned yoke and stops on the rod arranged to limit the compression of said coil springs.

MARGIA MANNING.